United States Patent
Nelson et al.

(10) Patent No.: US 8,094,073 B2
(45) Date of Patent: Jan. 10, 2012

(54) ROBUST VSAT TRACKING ALGORITHM

(75) Inventors: Larry A. Nelson, Seattle, WA (US); Thomas F. Coon, Lake Tapps, WA (US)

(73) Assignee: The Boeing Company, Chicago, IL (US)

( * ) Notice: Subject to any disclaimer, the term of this patent is extended or adjusted under 35 U.S.C. 154(b) by 453 days.

(21) Appl. No.: 12/371,866

(22) Filed: Feb. 16, 2009

(65) Prior Publication Data

US 2010/0207818 A1    Aug. 19, 2010

(51) Int. Cl.
*H01Q 3/00* (2006.01)
*H04B 7/10* (2006.01)
*G01S 5/02* (2010.01)

(52) U.S. Cl. ........ 342/359; 342/360; 342/361; 342/367; 342/369

(58) Field of Classification Search .......... 342/359–361, 342/367, 369, 420, 425–426
See application file for complete search history.

(56) References Cited

U.S. PATENT DOCUMENTS

| | | | | |
|---|---|---|---|---|
| 5,592,176 A | * | 1/1997 | Vickers et al. | 342/359 |
| 7,330,151 B1 | * | 2/2008 | Monk et al. | 342/359 |
| 2010/0127930 A1 | * | 5/2010 | Nelson | 342/372 |

OTHER PUBLICATIONS

Gabor, D., "Theory of Communication", J. Inst. Electr. Eng., vol. 93, 1946, Inst. Electr. Eng., London, UK.

* cited by examiner

*Primary Examiner* — Thomas Tarcza
*Assistant Examiner* — Fred H Mull
(74) *Attorney, Agent, or Firm* — Baldwin D. Quan

(57) ABSTRACT

A system and method to normalize a tracking control signal in a directional antenna system to reduce interference from an interfering adjacent transponder is presented. The system and method scans for the tracking signal along a scan path to produce a received signal strength indicator (RSSI) signal, coherently detects an RSSI image from the RSSI signal, and performs a morphologic feature estimation of the RSSI signal image to produce and output a normalized tracking correction.

23 Claims, 13 Drawing Sheets

ANTENNA SCAN

GABOR SCAN

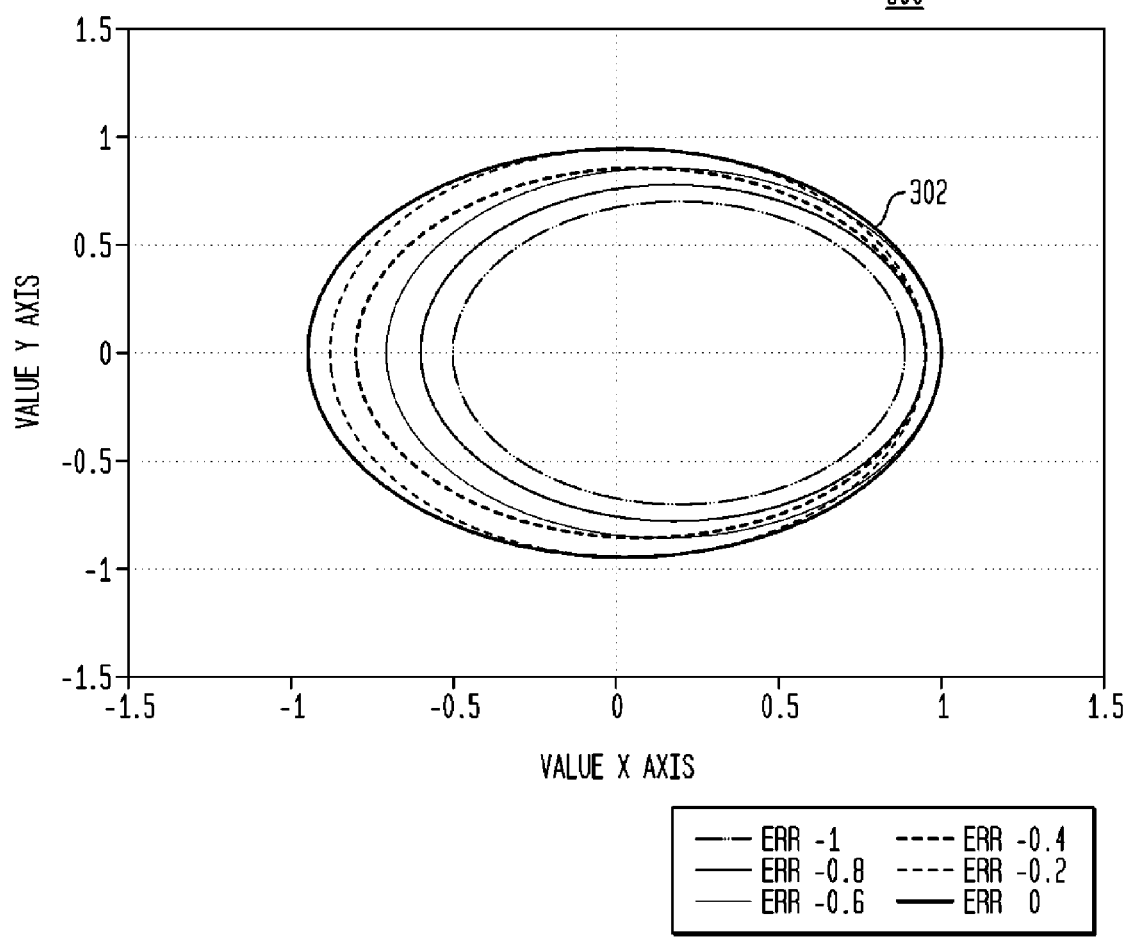

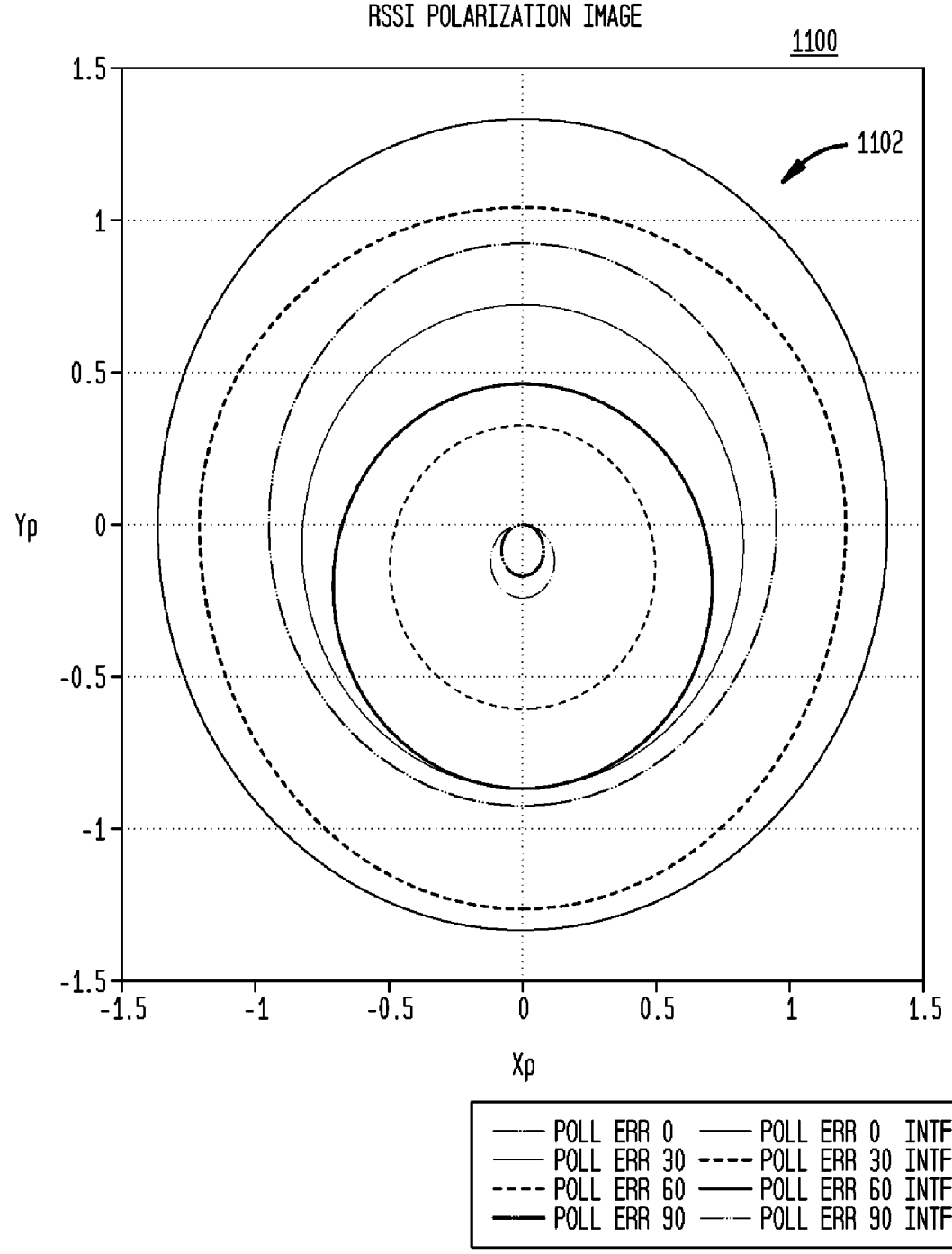

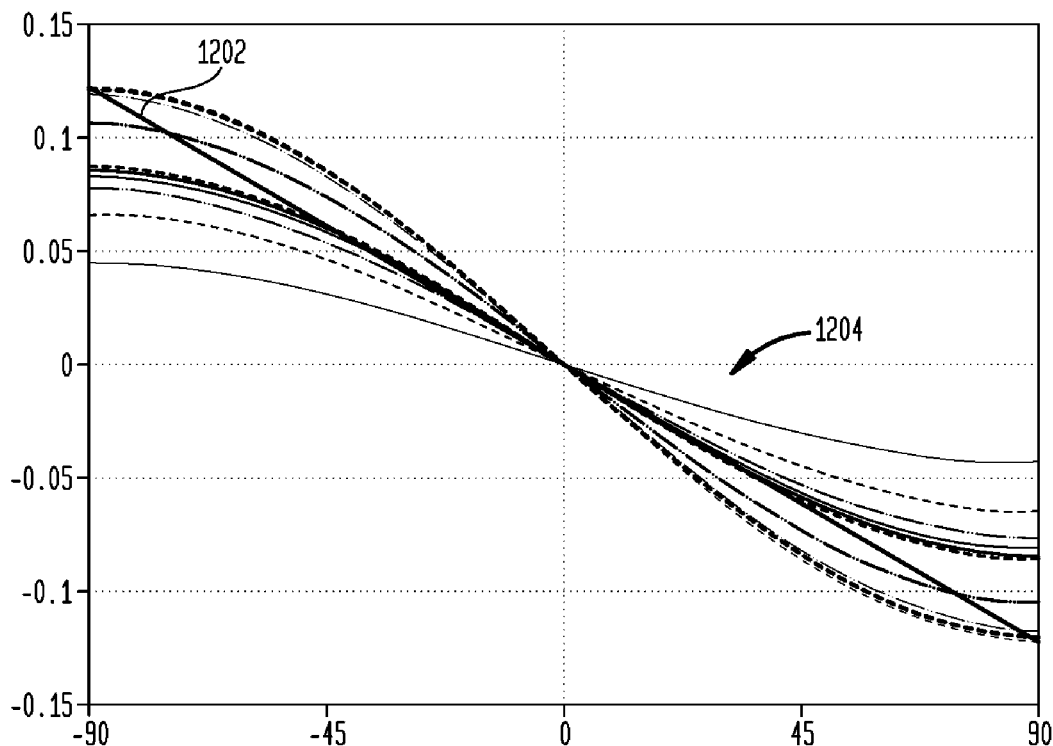

ROBUST VSAT TRACKING ALGORITHM

CROSS-REFERENCE TO RELATED APPLICATIONS

The present application is related to U.S. patent application Ser. No. 12/277,192 filed Nov. 24, 2008, entitled "Burst Optimized Tracking Algorithm", the entire disclosure of which is incorporated herein by reference.

FIELD

Embodiments of the subject matter described herein relate generally to a system and method for optimizing tracking algorithms of directional and directionally agile communications systems.

BACKGROUND

Communications systems that utilize non-stationary users or relay sites frequently use directional antennas to direct radio signals between stations. These directional antennas require a high degree of pointing accuracy to maintain adequate power in the communication link and to minimize interference with neighboring receptors. A means of maintaining this pointing accuracy by correcting for inertial reference drift or target movement is required.

Communications systems are designed to be as efficient as possible, both in terms of spectral efficiency and power efficiency. Moving stations require tracking systems to assist in directing radio signal beams. Tracking systems ensure that beams widths can be kept as narrow as possible. Narrow beam widths reduce the amount of power necessary for effective communication between stations, prevent unwanted parties from potentially receiving signals, and prevent overlap of signals onto spatially adjacent receivers, which is important for regulatory compliance.

Prior art tracking systems generally require large directional antennas and several degrees of separation between satellites to ensure tracking of the desired source. In practice however, antennas are often small aperture antennas and satellite separation can be minimal, creating the possibility of impairment to the tracking signal from those nearby satellites. These impairments change the nature of the tracking signal, corrupting the tracking signal and degrading the accuracy of the tracking capability. This in turn reduces the effective data capacity of data links between stations. In some instances, small aperture antennas use inertial pointing based on inertial reference units instead of tracking systems to point at the desired satellite and to stabilize the antenna orientation. But inertial reference units are susceptible to drift over time and operate without feedback for pointing accuracy. Because of this lack of feedback, mechanical movement accuracy of antennas degrades due to mechanical wear and perturbation from external sources, such as vibration.

SUMMARY

Presented is a system and method for improving tracking algorithms of directional communications systems for enhancing data communications between sending and receiving parties. In various embodiments, the system and method improves tracking accuracy and robustness, resulting in better data link power margins, higher data capacity, and improved beam directionality. The system and method reduces the effect of signal impairments from interfering sources by measuring the mathematical morphologic features of the detected tracking signal and using those features to normalize the pointing of the antenna against interference induced pointing error. By compensating for signal impairment, the system and method provides for data links with higher average throughput and subsequently lower costs per bit, promotes spectral efficiency, and improves security.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the robust VSAT (Very Small Aperture Terminal) tracking algorithm system and method. A brief description of each figure is provided below. Elements with the same reference number in each figure indicate identical or functionally similar elements. Additionally, the left-most digit(s) of a reference number indicates the drawing in which the reference number first appears.

FIG. 3 is an illustration of a set of representations of the tracking signal associated with pointing error of one embodiment of the robust VSAT tracking system and method;

FIG. 11 is an illustration of a set of RSSI polarization images for a range of polarization errors with and without an equal power interferer of one embodiment of the robust VSAT tracking system and method; and FIG. 12 is an illustration of a set of centroid feature values for a range of polarization errors and pointing errors with and without an equal power interferer in one embodiment of the robust VSAT tracking system and method.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Most communications systems have infrastructure and users. In most terrestrial, satellite-based, and wireless networks, infrastructure is fixed in place in an organized hierarchy, and users are either fixed or mobile. However, dynamic communications systems can be created where the mobile users also function as relay sites and other infrastructure can also be mobile. In these dynamic communications systems, it becomes increasingly important to be able to directionally control signal transmission as the relay sites and other mobile infrastructure elements (hereafter mobile network elements) dynamically change their position. Directional control of signal transmission conserves power utilization by allowing narrow beams to be used to communicate between mobile network elements instead of using wider angle transmissions. Directional control also conserves spectrum, by allowing multiple mobile network elements to use one or more common frequencies in a non-interfering manner.

As mobile network elements move, the architecture of the dynamic communications system can change. Connections between mobile network elements may therefore start and stop in differing periods of connectivity. Also, data may not be sent in a consistent manner between mobile network elements, but instead be sent in short bursts, thereby requiring only short periods of connectivity between individual mobile network elements. Further, depending upon the instantaneous architecture of the dynamic communications system, some mobile network elements may serve as hubs, or relay points, for multiple other mobile network elements.

Figure 1:
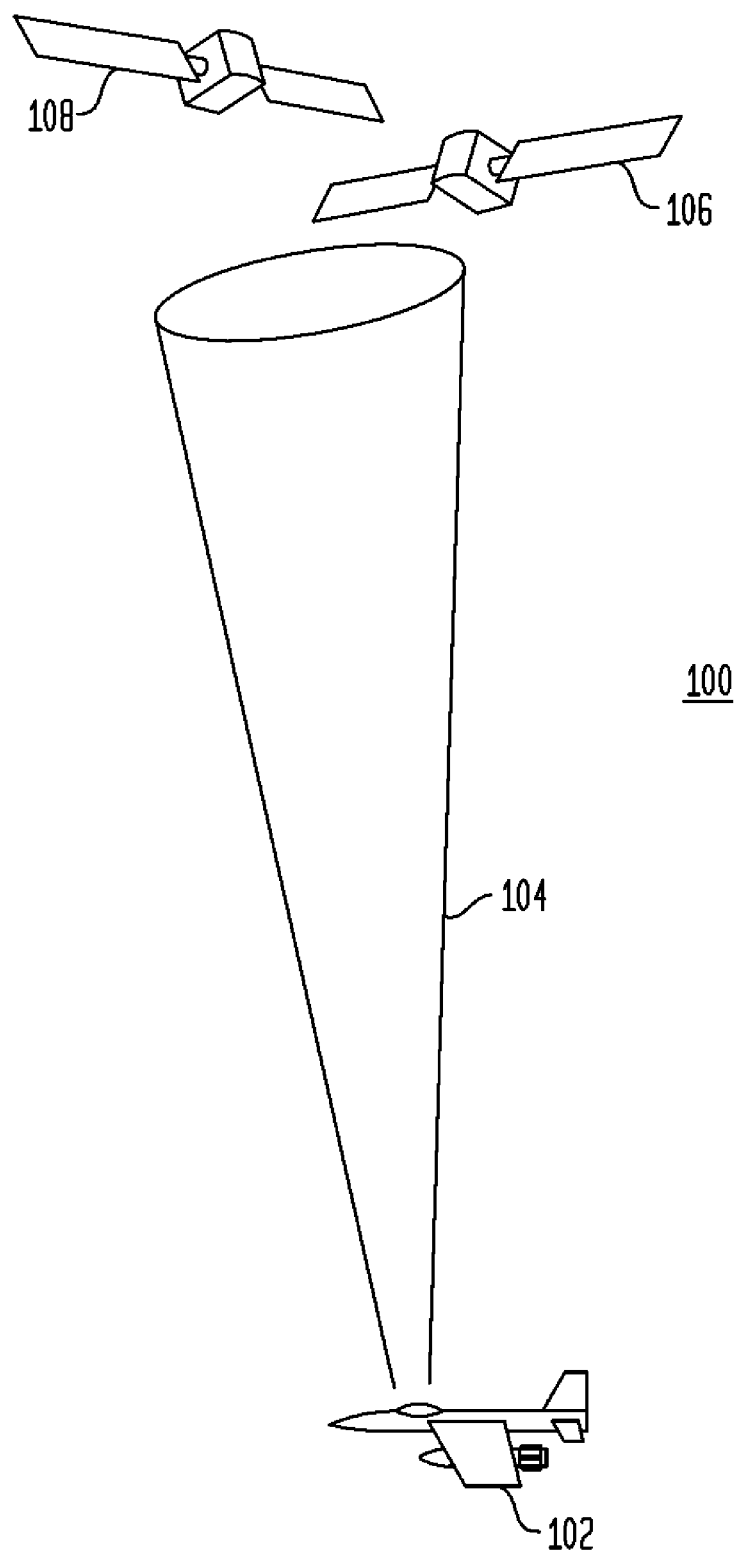
FIG. 1 is a diagram of a mobile network element, a tracked satellite and an adjacent satellite in one embodiment of the robust VSAT tracking system and method.

Referring now to FIG. 1, in a graphical representation of a portion of a mobile communications network 100, not shown to scale, a mobile network element 102 communicates with tracked satellite 108 using a small aperture antenna 402. The small aperture antenna 402 in mobile network element 102 is steered towards tracked satellite 108. Phased array antennas are one kind of directionally agile antenna that can rapidly be steered towards a tracked satellite 108 with a responsiveness that is suitable to mobile communications networks 100.

However, because of the low angular separation between tracked satellite 108 and adjacent satellite 106, that can be as low as 2 or 3 degrees, and the width of the directional characteristic of the antenna 402, adjacent satellite 106 can interfere with mobile network element's 102 reception of signal from tracked satellite 108. If mobile network element 102 uses an Inertial Reference Unit (IRU) 404 to point at tracked satellite 108, also called an open loop tracking solution, the pointing must be accurate enough to avoid receiving signal from adjacent satellite 106 or the signal from tracked satellite 108 can be overwhelmed by the signal from adjacent satellite 106. IRU 404 has error that causes error in the pointing system of the mobile network element 102. Additionally, because the IRU operates open loop for pointing determination, mechanical movement of small aperture antenna 402 may be inaccurate due to mechanical wear and perturbation from external sources, such as vibration.

Figure 2A:
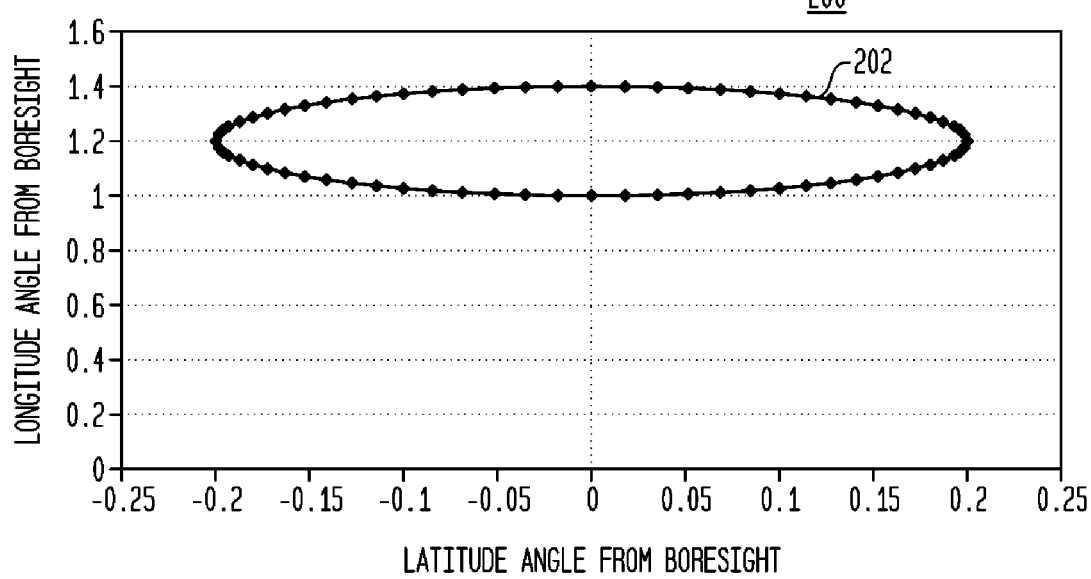
FIG. 2a is an illustration of a repeating antenna scan path of one embodiment of the robust VSAT tracking system and method.
Figure 2B:
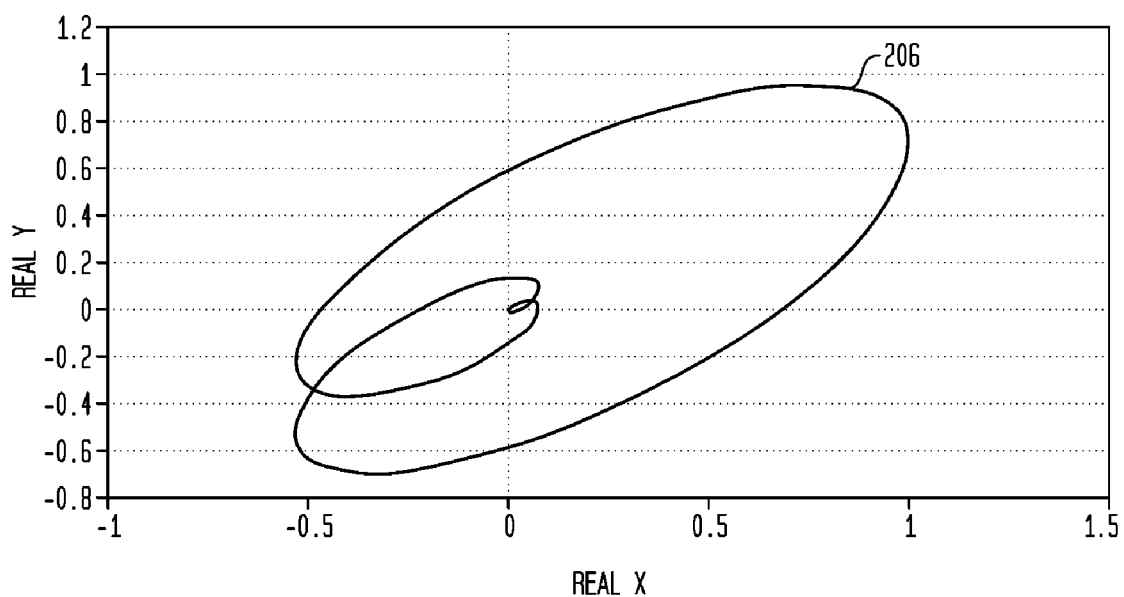
FIG. 2b is an illustration of a Gabor scan path of one embodiment of the robust VSAT tracking system and method.

Referring now to FIG. 2A, in a closed loop tracking solution, a mobile network element's 102 directional small aperture antenna 402 is pointed approximately towards the tracked satellite 108 and then scanned by a scan generator 406 in an equal amplitude scan 200. The tracking signal error for a small aperture antenna 402 is created by introducing an approximately circular scanning motion, or scan 202, at a small angle around the expected center of the signal beam. This modulates the tracking signal which, in a closed loop tracking solution, is processed to produce a tracking error signal. The tracking error signal is used to correct the pointing of mobile network element's 102 small aperture antenna 402. Although the figures, examples, and description disclosed hereafter reference small aperture antennas 402, the system and methods disclosed are applicable to both small aperture antennas 402 and other directional antennas, and directional beam scanning systems in general. FIG. 2B shows an alternative scan 202 path where the real x and real y axes are orthogonal scan axes such as suggested by Gabor. Such a Gabor scan 206 path provides a spectrally compact tracking signal for improved signal processing. In this embodiment, the system and method is adapted to advantageously use a Gabor scan 206, which requires knowledge of the Gabor scan 206 path.

An equal amplitude scan 200 moves the small aperture antenna 402 in approximately a circular motion with a radius of approximately 0.2 degrees. In one embodiment, the signal received from the satellite is sampled at intervals representing 72 steps along the scan 202. The received signal is detected by a coherent detector 412 to produce outputs which are presented as an overlaid set of RSSI (Received Signal Strength Indication) images 300. For illustration purposes, the scan 202 in FIG. 2a is performed using a directional antenna mispointed by 1.2 degrees in longitude and using a small aperture antenna 402 having a main lobe whose amplitude is:

$$RSSI = 10^{-(0.15\theta^2)}$$

where θ is the solid angle from the small aperture antenna 402 boresight.

Referring now to FIG. 3, an overlaid set of RSSI images 300 for scans 202 without interference is presented. RSSI image without interference 302 represents off boresight pointing error amounts of 0, 0.2, 0.4, 0.6, 0.8, 1.0 degrees. The values on the X and Y axes are scalar values associated with the gain on each axis of the coherent detector 412. The centroid shifts along the x axis as the pointing error moves in the x direction. The RSSI images 300 for scans 202 without interference show a substantially circular shape because no interferer is present. In alternate illustrations and embodiments, other shapes are possible depending upon the gains of the two axes in the coherent detector 412, the relative phase between the two axes, the waveform driving the coherent detector 412, and the scan 202 shape. As mobile network element's 102 small aperture antenna 402 mispoints away from the tracked satellite 108, the RSSI image 300 size decreases due to the attenuation of the received signal strength by the small aperture antenna 402 main lobe. Mispointing is illustrated for values between 0 degrees and 1.0 degree with the minus sign indicating the correction needed to point toward the tracked satellite 108.

Although the scan 202 is illustrated as a circular closed scan, the basic idea of deriving features from RSSI images 300 and using those features to construct the morphologic tracking estimate MEoutput 420a, 420b, 420c, or collectively MEoutput 420, does not depend upon the circular nature of the scan 202. In alternate embodiments of the robust VSAT tracking system 400, the scan 202 is an elliptical scan, a Gabor scan 206, or other scan. Referring to FIG. 2B, a commonly used uncertainty metric, often attributed to Gabor [Gabor, D., "Theory of Communication", J. Inst. Electr. Eng., Vol. 93, 1946], is the product of two effective widths, $$U = (\Delta\chi)(\Delta\omega)$$

where these widths are the normalized variance of the energy density in the spatial and spatial frequency domains:

$$(\Delta x)^2 = \frac{\int (x-x_0)^2 |g(x)|^2 dx}{\int |g(x)|^2 dx}$$

$$(\Delta \omega)^2 = \frac{\int (\omega-\omega_0)^2 |G(\omega)|^2 d\omega}{\int |G(\omega)|^2 d\omega}$$

This product has a lower bound, as suggested by Heisenberg:

$$U \geqq 0.5$$

Gabor showed in 1946, that the complex functions, $$g(x) = e^{j(\omega x+\theta)} e^{-\left(\frac{x^2}{2\sigma^2}\right)}$$

achieve the lower bound of the uncertainty product. Note that this is a product of a periodic scan having substantially sinusoidal nature (in one dimension, circular or elliptical in two dimensions) times a Gaussian apodization function. This Gabor scan 206 may be spectrally compact (i.e. approaching the Heisenberg limit) and therefore have advantages in signal processing to achieve improved signal to noise in the robust VSAT tracking system 400. Another embodiment of the improved VSAT tracking algorithm uses a Gabor scan 206 in one or more axes. The changes to the RSSI images 300 depend upon the power received from a tracked source and an interfering source (or sources) and the main beam shape for any type of closed scan 202.

The tracking signal received by the mobile network element 102 small aperture antenna 402 is intended to be only from the tracked satellite 108, but may also include interference from interfering satellite 106. The amount of interference received depends upon the directivity of the small aperture antenna 402 and the modulation of the signals on both the tracked satellite 108 and interfering satellite 106. The tracked signal is demodulated before its strength is measured, so interfering signals can be rejected both by the antenna directivity and by the demodulation process. When the adjacent satellite 106 is transmitting in the same frequency band as the tracked satellite 108, the tracking and the interfering signals can superpose in the tracking system. Because this composite signal is not representative of the tracking state, tracking errors are created by the tracking system. If the signal from the adjacent satellite 106 is strong enough compared to the signal from the tracked satellite 108, the signal from the adjacent satellite 106 can pull the mobile network element's 102 small aperture antenna 402 off of tracked satellite 108 and towards adjacent satellite 106, resulting in loss or degrading of the communications link between the mobile network element 102 and the tracked satellite 108. For example, with large amounts of interference power compared to the tracked power, antennas that have a main lobe −3 dB width of 2 degrees or greater cannot sufficiently reject signals from adjacent satellites 106 that are 2 degrees apart. Further, some small aperture antennas 402 are asymmetric (i.e., not circularly symmetric), and may therefore have sufficient directivity along one aperture axis, but not on a shorter aperture axis, leading to a change in interferer effect that depends on the mobile network element's 102 heading and small aperture antenna 402 alignment with respect to the mobile network element 102.

Figure 4:
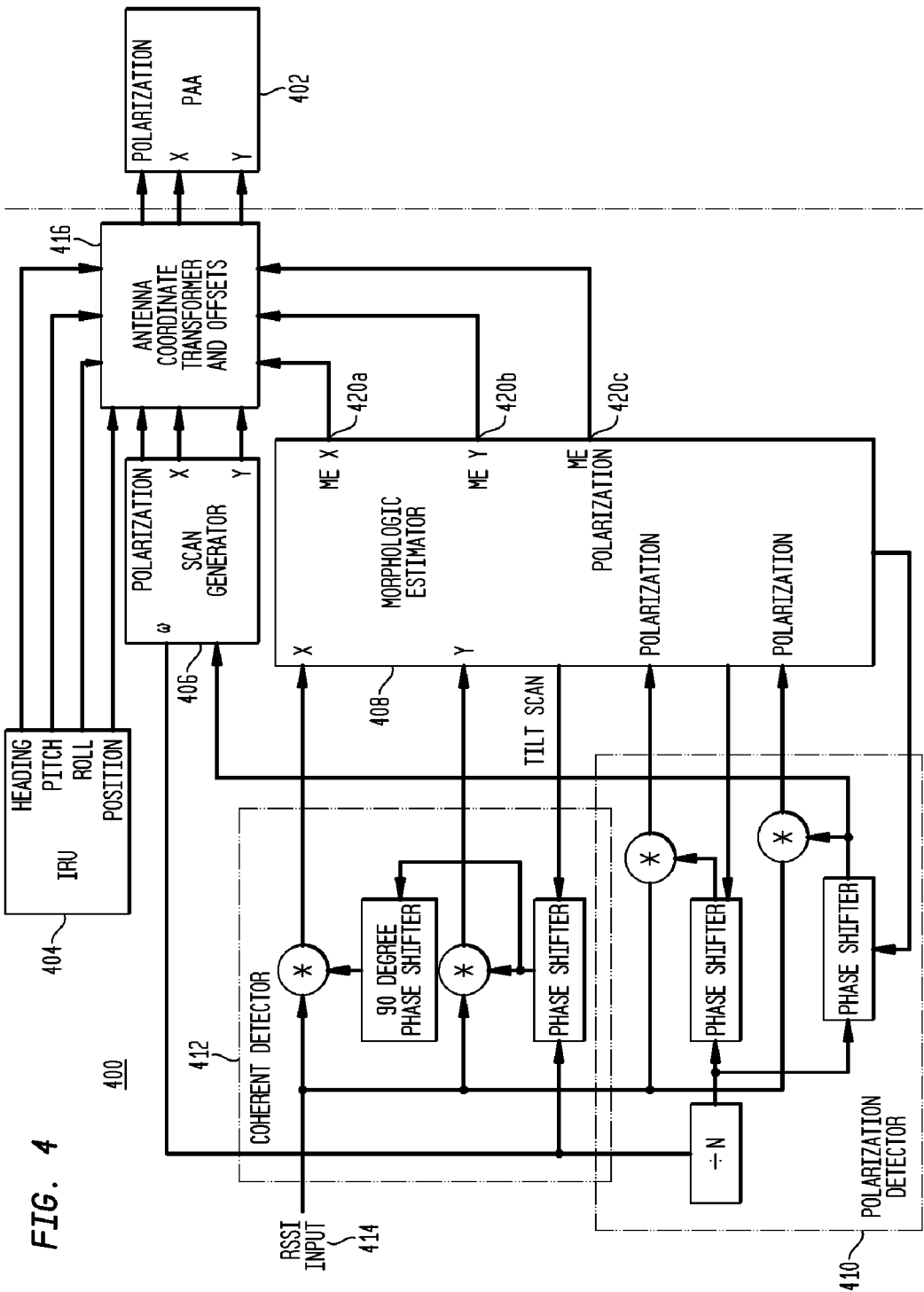
FIG. 4 is a diagram of the tracking system functional elements of one embodiment of the robust VSAT tracking system and method.

To compensate, the robust VSAT tracking system 400 uses mathematical morphology information from an RSSI image 300 derived from a coherent detector 412 and pursuant to a scan 202 to reduce the effects of the interference from the adjacent satellite 106. Referring now to FIG. 4, a block diagram of the robust VSAT tracking system 400 is presented. The robust VSAT tracking system 400 comprises an IRU 404 that directs the mobile network element's 102 directional small aperture antenna 402, for example a Phased Array Antenna (PAA), approximately towards the tracked satellite 108 and inertially stabilizes the pointing attitude of the small aperture antenna 402. In one embodiment, the IRU 404 provides heading, pitch, roll, and position information that are processed by an Antenna Coordinate Transformer 416 to derive the appropriate x and y pointing and polarization attitude for the small aperture antenna 402. In another aspect of the embodiment, the IRU 404 provides the mobile network element 102 with position information for aligning the polarization of the small aperture antenna 402 with the polarization of the tracked satellite 108.

The Antenna Coordinate Transformer 416 processes inputs from the IRU 404, scan generator 406, and Morphologic Estimator 408 to provide the corrected x and y pointing attitude and polarization to the small aperture antenna 402. In one embodiment, the Antenna Coordinate Transformer 416 translates data from different coordinate systems into a coordinate system of the small aperture antenna 402. In alternate embodiments, the Antenna Coordinate Transformer 416 vector sums inputs from IRU 404, scan generator 406, and Morphologic Estimator 408, and presents them to the small aperture antenna 402.

Figure 5:
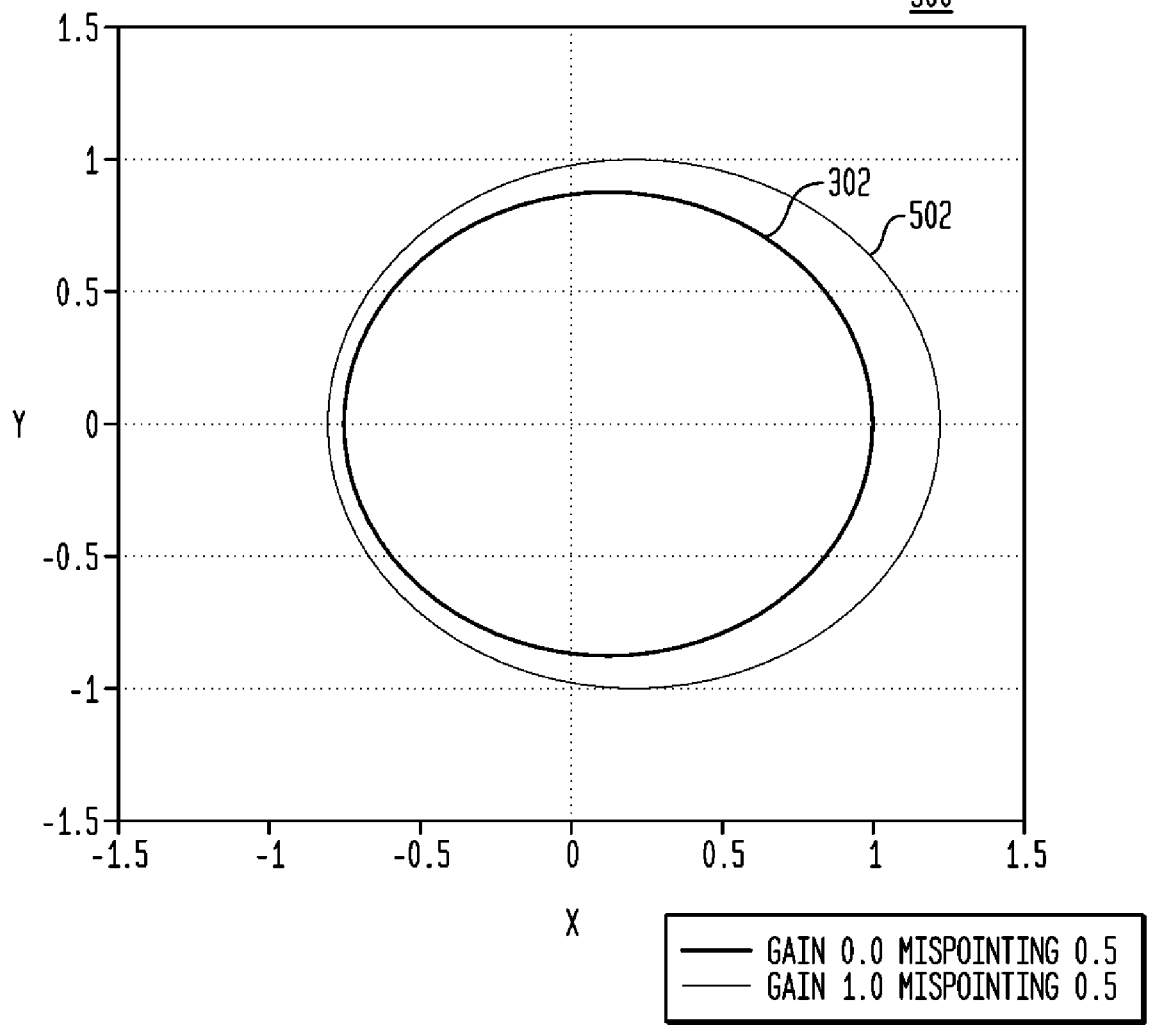
FIG. 5 is an illustration of the effect interference has on the tracking signal in one embodiment of the robust VSAT tracking system and method.

The scan generator 406 performs an equal amplitude scan 200 in the direction of the tracked satellite 108. Referring to FIG. 5, a coherent detector 412 operating at the same frequency (ω) as the scan generator 406 receives RSSI signal 414 during the scan 202 that is created by power received from both the tracked satellite 108 and the interfering adjacent satellite 106 and produces an RSSI image with interference 502 that differs in shape and size from what would have been received if there were no interference, as shown in overlaid RSSI image without interference 302. In this example, the RSSI image with interference 502 and the RSSI image without interference 302 are distinguishable because of differences in shape and centroid. In one embodiment, the RSSI signal 414 is a series of ordered data representing the RSSI signal strength for a series of data points in the scan 202. In other embodiments, the RSSI signal 414 is analog, comprises a set of digital samples, or is another representation of the RSSI signal 414 during one or more scans 202.

The robust VSAT tracking system 400 organizes RSSI image 300 information into patterns whose character is revealed in strong morphologic features. The RSSI image 300 is sampled on a basis that is sufficient to produce features with adequate resolution, for example every 5 degrees for an approximately circular scan 202. From the RSSI image 300 morphologic features are measured. The morphologic features created are processed to select those morphologic features significant to the problem being solved. Using a training set of input conditions, a weighted sum of feature values is calculated and subtracted from a desired characteristic to determine an error characteristic. A regression analysis is used to determine the weights that give the minimum total squared error. In this example embodiment, the desired characteristic normalizes the tracking output to be largely independent of interference, for example from adjacent satellite 106.

The morphologic estimator 408 calculates the tracking outputs from the RSSI image with interference 502 through the summed use of measured features multiplied by the weight values determined using the training set. Features are morphologic measures that encode the essential qualities of the RSSI images 302, 502. Example features comprise centroid, compactness, skewness and kurtosis. Additional features comprise the power series expansion of the principle features and combinations of the principle features, including centroid squared, (1-compactness) squared, skewness squared, kurtosis squared, centroid*compactness, centroid*skewness, centroid*kurtosis, compactness*skewness, compactness*kurtosis, and skewness*kurtosis.

Centroid

Figure 6:
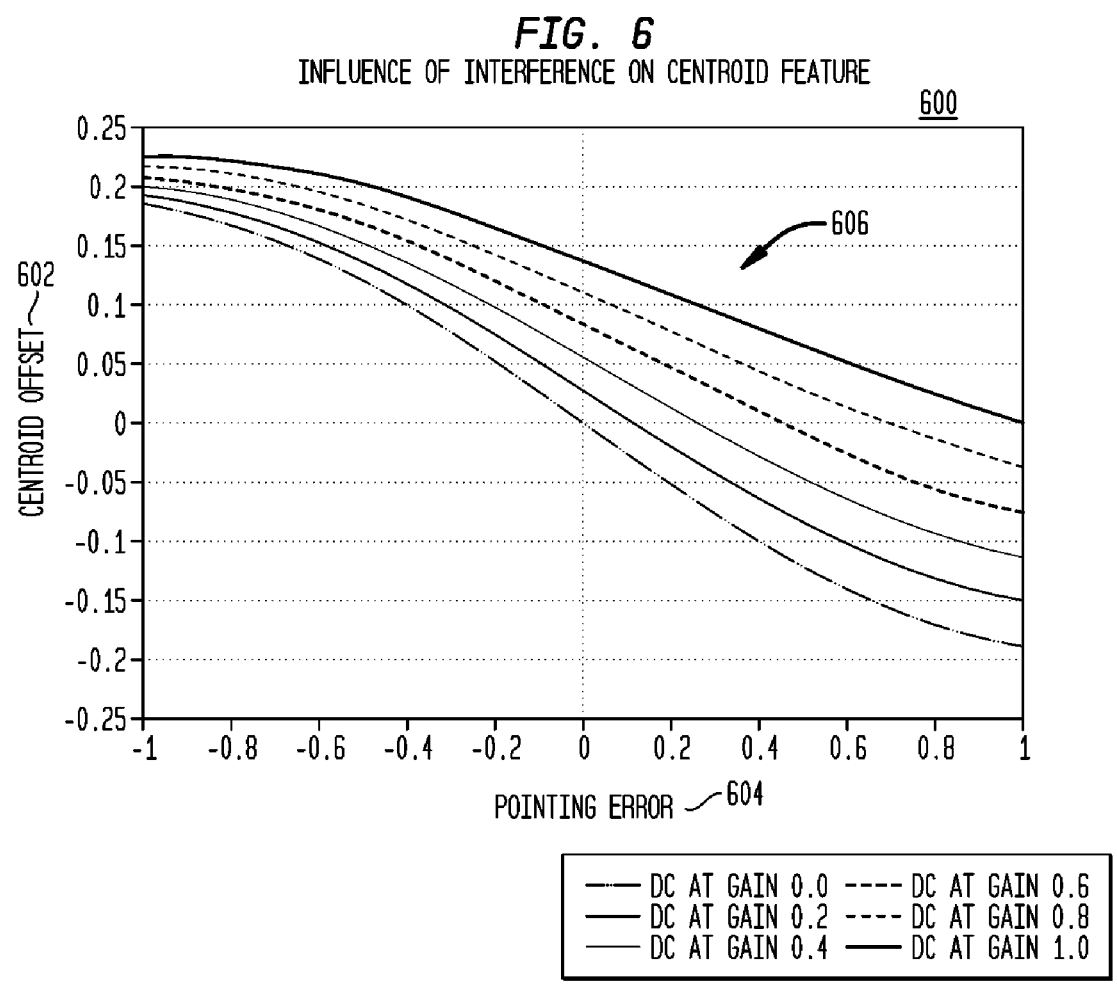
FIG. 6 is an illustration of a set of centroid features for a range of interference to the tracking signal in one embodiment of the robust VSAT tracking system and method.

The centroid is the mean of the closed path of a scan 202. It is the measure of the center offset of the RSSI image with interference 502. With no normalization, it is the basic measure for mispointing. In one dimension the centroid is $$\text{Centroid} = \frac{1}{N}\sum_{1}^{N} x_i$$

Where $\chi_i$ is the element of the set of N samples from a closed scan 202 in the RSSI image with interference 502. Referring now to FIG. 6, the set of overlaid centroid feature curves 600 show the X axis centroid 602 of the closed scan 202 RSSI image with interference 502 versus mispointing 604 for a set of interference conditions having amplitude relative to the tracked satellite 108 of 0, 0.2, 0.4, 0.6, 0.8, 1.0 relative interference power ("gain"). A complementary measure of overlaid centroid feature curves 600 exists for y values of the RSSI image with interference 502. The centroid error feature can be expressed in two dimensions with non-independent axes, but for simplicity of explanation most of the features will be explained in their minimum dimensionality.

FIG. 6 shows that in a tracker operating on the basis of the centroid feature, the interfering adjacent satellite 106 causes a pointing error and may also, for large values of interference, cause the tracking to diverge off of the tracked satellite 108. The slope of the centroid error curvilinear lines 606 is related to the gain of the tracking control loop. When the slope decreases or changes sign the transient response of the control loop changes, leading to poor tracking transient response and finally to pull off from the tracked satellite 108. A desirable attribute of a tracking controller would be for gain to remain relatively constant for all mispointing and for it to be independent of interferer gain, where gain is the relative amplitude of the interfering adjacent satellite 106 when compared to the tracked satellite. A tracking system having these attributes, as described in this disclosure, is referred to as normalized against interference.

Compactness

Figure 7:
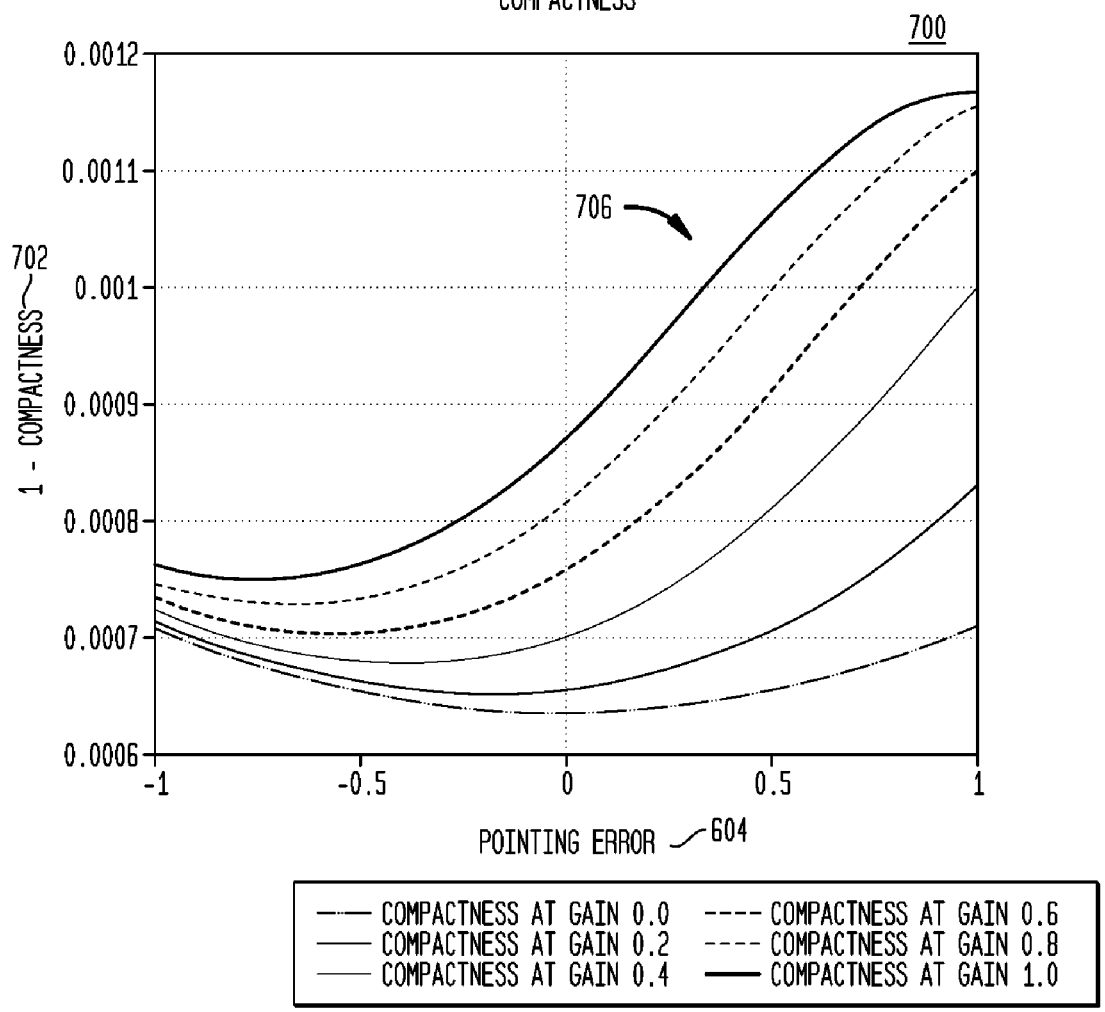
FIG. 7 is an illustration of a set of 1-Compactness features for a range of interference to the tracking signal in one embodiment of the robust VSAT tracking system and method.

Compactness is the area of the closed path of a RSSI image with interference 502 divided by the area of a circle having the same perimeter length as the closed path RSSI image with interference 502. Compactness measures the circularity of the RSSI image with interference 502. Compactness is a low noise measure because it is the accumulation of a set of samples from a complete RSSI scan 202. It is insensitive to received power because it is normalized by area. Referring now to FIG. 7, the set of overlaid compactness feature curves 700 show the X axis compactness variation 702 (i.e., 1-compactness variation) with pointing error 604 for a 0.4 degree equal amplitude scan 200 and an interferer +2 degrees away on the x axis having amplitude relative to the tracked satellite 108 of 0, 0.2, 0.4, 0.6, 0.8, 1.0. Individual compactness characteristics 706 express compactness for each gain value.

Skewness

Skewness is the normalized accumulated sum of the third order moment about the mean for a complete scan 202 of the RSSI image with interference 502. In one dimension it is $$\text{Skewness} = \frac{1}{N}\sum_{1}^{N} (x_i - \ddot{x})^3$$

Where $\ddot{\chi}$ is the mean of $\chi_i$

Figure 8:
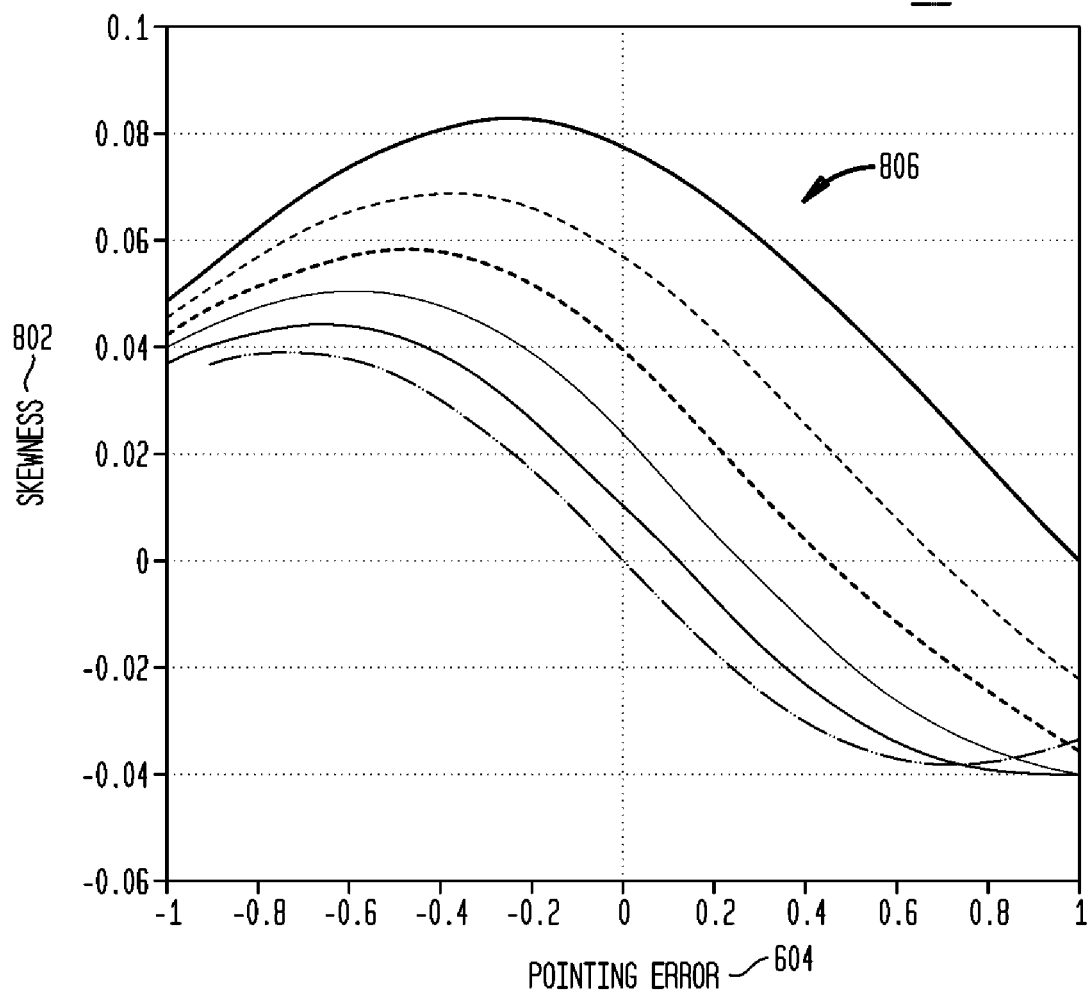
FIG. 8 is an illustration of a set of Skewness features for a range of interference to the tracking signal in one embodiment of the robust VSAT tracking system and method.

Skewness measures the amount of eccentricity of closed scan 202 RSSI image with interference 502. Referring now to FIG. 8, the set of overlaid skewness feature curves 800 show X axis skewness variation 802 with pointing error 604 for a 0.4 degree equal amplitude scan 200 and an interferer +2 degrees away on the x axis having amplitude relative to the tracked satellite 108 of 0, 0.2, 0.4, 0.6, 0.8, 1.0. Individual skewness characteristics 806 express skewness for each gain value. A complementary measure of skewness exists for y values of the RSSI image with interference 502.

Kurtosis

Kurtosis is the normalized sum of fourth order moment about the mean of the samples of a closed scan 202 RSSI image 300. It is a measure for how the distribution of RSSI image values acquires its eccentricity. In one dimension Kurtosis is:

$$\text{Kurtosis} = \frac{1}{N}\sum_{1}^{N} (x_i - \ddot{x})^4$$

Where $\ddot{\chi}$ is the mean of $\chi_i$

Figure 9:
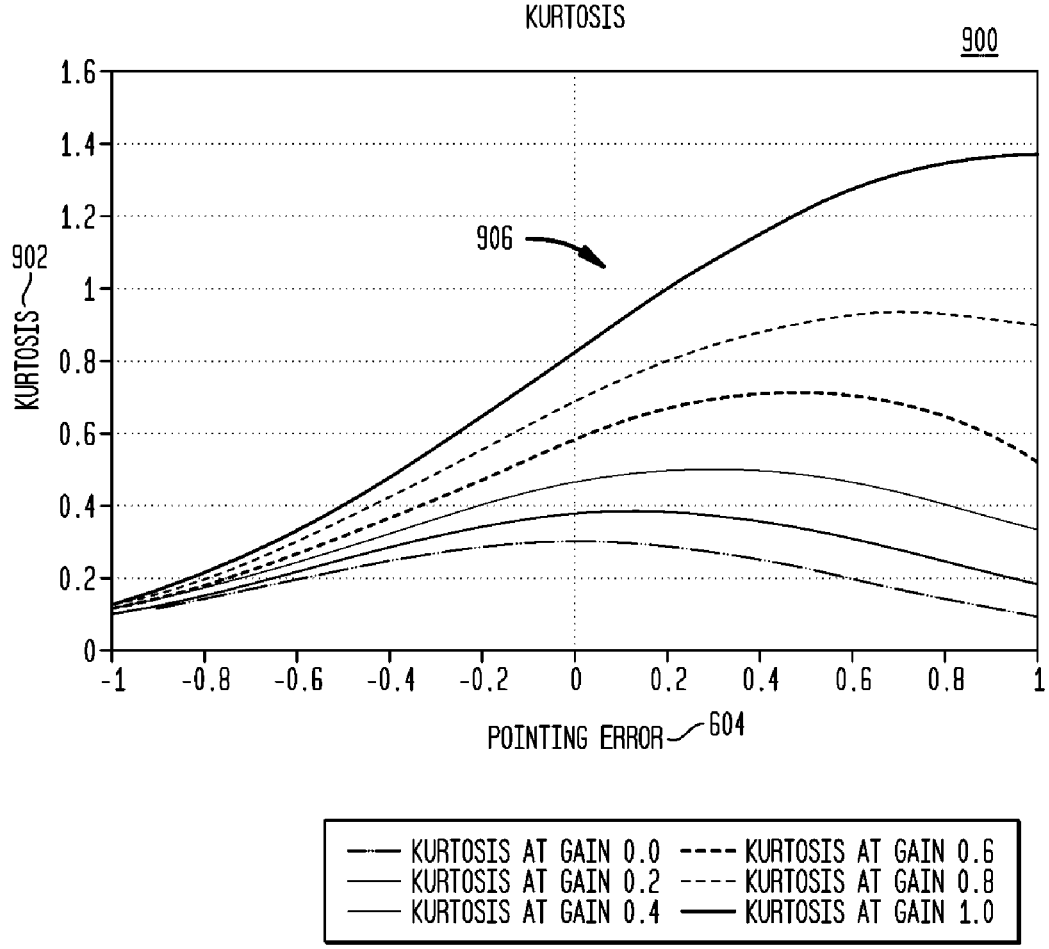
FIG. 9 is an illustration of a set of Kurtosis features for a range of interference to the tracking signal in one embodiment of the robust VSAT tracking system and method.

Referring now to FIG. 9, the set of overlaid kurtosis feature curves 900 show X axis kurtosis variation 902 with pointing error 604 for a 0.4 degree equal amplitude scan 200 and an interfering adjacent satellite 106 that is +2 degrees away and having amplitude relative to the tracked satellite 108 of 0, 0.2, 0.4, 0.6, 0.8, 1.0. Individual kurtosis characteristics 906 express skewness for each gain value. A complementary measure of kurtosis exists for y values of the RSSI image with interference 502.

Morphologic Estimation Process

The morphologic estimate, MEoutput 420, for tracking is determined by a regression analysis using the features.

$$MEoutput_j = \sum_{1}^{M} (F_i * W_i)$$

Where $W_i$ is the weight vector (eigenvalues) for the features $F_i$ evaluated at a mispointing position j. These eigenvalues are determined by a regression analysis. In one embodiment the regression analysis is a linear regression analysis using a desired value that is the ideal of the non-interfering centroid feature at the origin extended to a range of ±1 degree of mispointing. The error is determined between the desired fit and the MEoutput 420 for each pointing offset angle j:

$$\epsilon_j = MEoutput_j - Desired_j.$$

A search algorithm is used to find the minimum of:

$$\min\left[\sum_{trainingset}\sum_1^M \beta_j \epsilon_j^2\right]$$

where M is the number of mispointing values included in each MEoutput 420. The training set includes the entire range of relative interference values (i.e. gain) that are to be included in the design basis. $\beta_j$ is a weighting vector used to emphasize the errors (and therefore reduce the errors preferentially) closer to the low pointing error center of the tracking control output, MEoutput 420. The weights $W_i$ are adjusted by the search algorithm to minimize the total squared error over the entire training set. The values reached through this minimization process are the eigenvalues for the features used to construct the MEoutput 420 shown in FIG. 4. In this embodiment, the X and Y values $W_{ix}$ and $W_{iy}$ are determined separately through similar steps.

Figure 10:
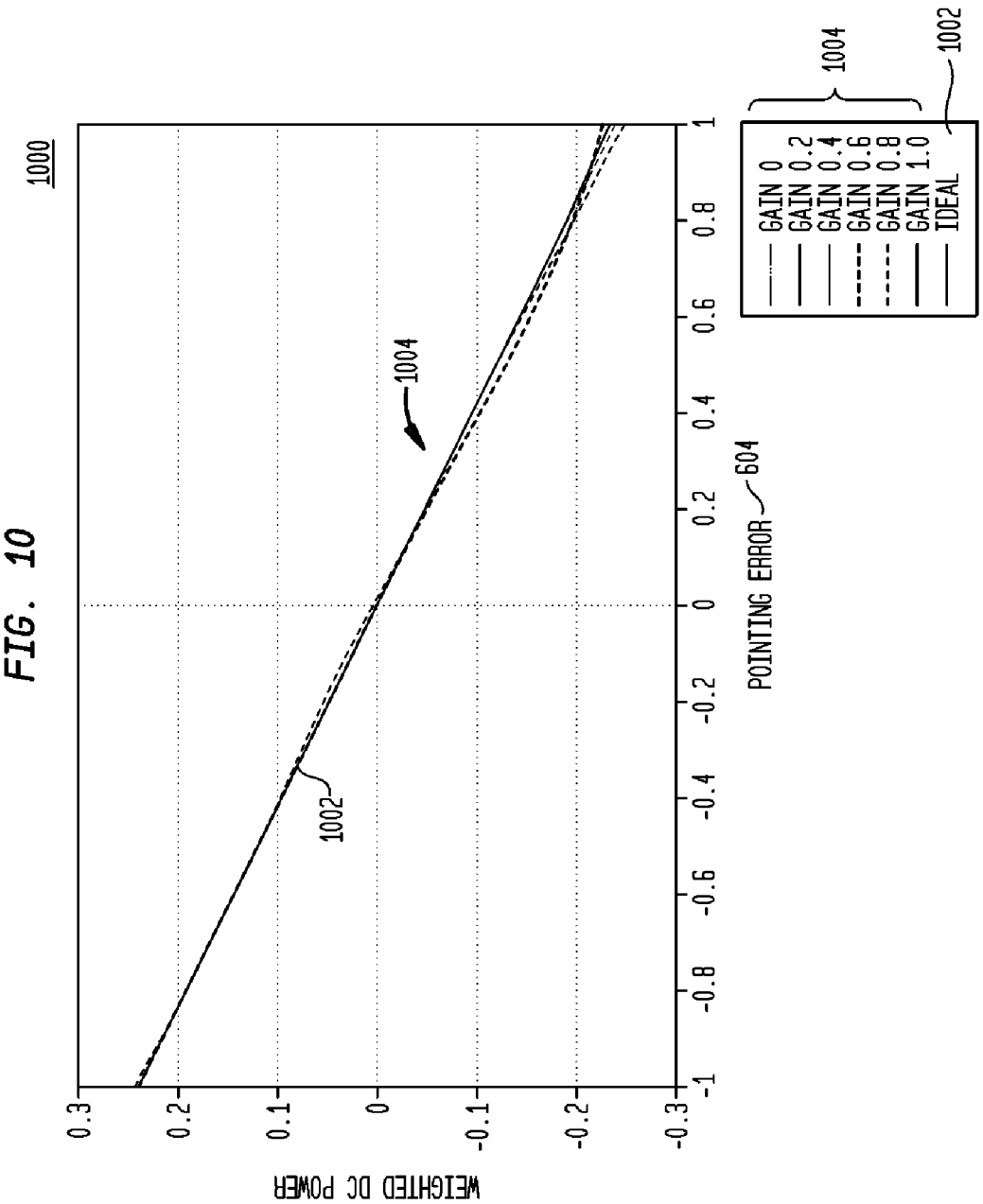
FIG. 10 is an illustration of an overlay of a desired tracking characteristic with a plurality of normalized tracks for different amounts of interference, in one embodiment of the robust VSAT tracking system and method.

After the Eigenvalues $W_{ix}$ and $W_{iy}$ are determined, MEoutput 420a, 420b for the tracking system shown in FIG. 10 is $$MEoutput_{jx} = \sum_1^M (F_{ix} * W_{ix})$$

$$MEoutput_{jy} = \sum_1^M (F_{iy} * W_{iy}).$$

Referring now to FIG. 10, an illustration of the morphologic estimate outputs 1000 is presented. The X-axis MEoutput 420a is illustrated as normalized MEoutput curvilinear lines 1004 for each of the relative interference values: 0, 0.2, 0.4, 0.6, 0.8, 1.0. The fit for X-axis MEoutput 420a, for each of normalized MEoutput curvilinear lines 1004, to the desired output 1002 is not exact, but rather there is generally small error between the desired output 1002 and each of the normalized MEoutput curvilinear lines 1004. The weighted dc power for each of normalized response curves, MEoutput curvilinear lines 1004, is scaled in this example so as to be easily compared with the centroid feature curves 600 of FIG. 6. The normalization of the control that is achieved is apparent in the compactness of the overlaid characteristics.

Polarization

A mobile network element's 102 small aperture antenna 402 maintains polarization based upon the mobile network element's 102 position and the position of the tracked satellite 108. A mobile network element's 102 position affects polarization alignment between the satellite and the small aperture antenna 402. Anomalies in polarization decreases receive sensitivity and transmit data rate capability and can cause interference to cross polarized transponders.

Lack of precision polarization alignment also limits tracking accuracy, acquisition range, and acquisition speed. Many inertially pointed small aperture antennas 402 utilize open loop pointing systems (i.e. no tracking system), which requires a high precision IRU 404 having low drift and high sensitivity. The mechanical translation of the IRU 404 pointing input into a stabilized antenna direction needs to be resistant to wear and perturbation. Also, the power (i.e. data rate) has to be decreased from a regulatory maximum to provide margin for the open loop control errors. To realize the needed bandwidth after back-off margins are incorporated, the transponder capacity has to be increased. Power margins are incorporated to reduce the transmitted power to account for polarization errors, and if interference arises due to mispolarization, transmission is interrupted.

Referring again to FIG. 4, in one embodiment, the robust VSAT polarization tracking system 400 further comprises a polarization detector 410. The strength of the RSSI signal 414 is affected by the polarization of the small aperture antenna 402 relative to the polarization of the received signal. Therefore changes to the polarization during a scan 202 affect the RSSI signal 414 input into the morphological estimator 408, which in turn would affect the position estimation process of the morphological estimator 408. In one embodiment, to facilitate the position estimation process in the morphological estimator 408, the polarization is held constant during each complete scan 202 of the tracked satellite 108. At the end of one complete scan 202, and just prior to the start of another scan 202, the polarization is incremented in the small aperture antenna 402. After each subsequent scan 202, the polarization is again changed such that after a number of scans 202, N, the polarization will return to the original starting polarization, where N represents the number of polarization samples used to create each RSSI polarization image 1100.

The RSSI polarization image 1100 is created by the polarization detector 410 from the N polarizations samples. The polarization detector 410 operates at a scanning frequency that is an integer submultiple of the position scan 202 from the scan generator 406, and each polarization sample is held constant during the subsequent position scan 202 of the tracked satellite 108. If the scan generator 406 outputs a position tracking frequency $\omega_x$, then the polarization scan frequency $\omega_p$ is 1/N times the position tracking frequency $\omega_x$. By keeping the polarization scan of the small aperture antenna 402 constant during each position scan 202, the effect on the position tracking features caused by polarization tracking is nulled and vice versa. In this embodiment, linear polarization is tracked, so the polarization scan is one-dimensional:

$$\text{polarization} = k * \text{Cos}(\omega_p^t)$$

$$\omega_p = \frac{\omega_x}{N}$$

Where k is a scalar for the amount of polarization scan, $\omega_x$ is the position scan frequency in the x (and in this example the y also) direction, N is the number of position samples for each RSSI polarization image, and $\omega_p$ is the polarization scan frequency.

Continuing to refer to FIG. 11, the RSSI polarization diagram 1100 shows an overlaid presentation of the RSSI output of the polarization detector 410 that results from polarization scans for a number of operating conditions. The RSSI polarization images 1102 shows polarization outputs for polarization errors of 0, 30, 60, 90 degree conditions both with and without an equal power interferer (denoted INTF 1 in FIG. 11 when an interferer is present) such as adjacent satellite 106, in this example +2 degrees offset from tracked satellite 108. Note that for large polarization errors, the presence of the interfering adjacent satellite 106 alters the shape and size of the RSSI polarization images 1102. The RSSI polarization images 1102 illustrate that the centroid feature is an indicator of polarization error, $$centroid_y = \sum_i y_{p_i}$$

where $y_p$ is a coordinate of the RSSI polarization images 1102.

Referring now to FIG. 12, the centroid tracking feature for polarization diagram 1200 shows a set of overlaid polarization centroid features 1204 that are computed from the RSSI polarization image 1102. The feature values are shown on the vertical axis and the polarization error in degrees is shown on the horizontal axis. The y polarization centroid features 1204 are shown for a range of pointing errors from −1 to +1 degree in longitude with and without the equal power interferer adjacent satellite 106 (designated by INTF 1) spaced +2 degrees away from the tracked satellite 108. Gain of the polarization centroid feature 1204 is the slope of the control characteristic shown in FIG. 12 for each condition. Note that whereas the gain of the polarization centroid feature 1204 varies with interferer gain, the slope polarity of the polarization centroid feature 1204 does not change. For improved polarization tracking system transient response by normalization of control loop gain, a normalized tracking system is constructed from a weighted combination of RSSI polarization image features in a manner similar to what was done for position tracking. A normalized polarization tracking system produces a polarization tracking response characteristic approximating that shown as the desired response characteristic 1202.

In one embodiment, the robust VSAT tracking system 400 uses only the centroid feature from the RSSI polarization image 1102. The morphologic estimator produces a morphologic estimate, MEoutput 420c, for polarization tracking. The morphologic estimate, MEoutput 420c, is used to align the small aperture antenna's 402 polarization with the tracked satellite 108 (i.e., zero polarization error) by offsetting the polarization determined based upon the position and heading received from the IRU 404. In another embodiment the robust VSAT tracking system 400 uses mathematical morphology information from the RSSI polarization images 1102 derived by a polarization detector 410 to normalize the polarization tracking response characteristic against the effect of interference from the adjacent satellite 106.

In other embodiments, polarization features include centroid, compactness, skewness, kurtosis and power series and cross products of those basic features derived from the RSSI polarization images 1102. In another embodiment, the polarization features are combined with the position tracking features to further improve the tracking solution. For example, in one embodiment, the compactness becomes a 3-dimensional morphological construct "volume", compared to the volume of a "sphere" having equal "surface area". In another embodiment, polarization tracking receives an input from both the I and Q axes of a detector for a detection system wherein the polarization vector transmitted is two dimensional.

CONCLUSION

The morphologic estimator 402 normalizes position tracking and polarization control characteristics, reducing the influence of an interfering adjacent satellite 106 on the tracking system centering and transient response, and improving position and polarization alignment of the small aperture antenna 402 with that of the tracked satellite 108. This improved tracking allows more power to be directed toward the tracked satellite 108 by reducing power margins that would otherwise be required. Data rates can be increased and transponder bandwidths decreased.

In one embodiment, the system and method creates a tracking solution for small aperture antennas 402 that are not easily disturbed by close proximity of the tracked satellite 108 to an adjacent satellite 106. This allows a reduction in cost of the antenna construction due to reduced IRU 404 requirements, and the robust VSAT tracking system 400 further reduces the size and weight of the tracking system. Spread spectrum modulation with code division multiplexing used on present art very small aperture terminals to enable tracking solutions is not required, leading to increased bandwidth on the forward link or decreased transponder bandwidth. Data rate is increased because power margins for mispointing are reduced or eliminated. The robust VSAT tracking system 400 enables mobile network elements 102 to communicate with satellites and other transponders that are close together while using less transponder bandwidth, reducing recurring bandwidth costs, and reducing the need to place additional transponders in operation. In other embodiments, the system and method are applicable to tracking other passive or active sources of electromagnetic radiation.

The embodiments of the invention shown in the drawings and described above are exemplary of numerous embodiments that may be made within the scope of the appended claims. It is contemplated that numerous other configurations of a robust VSAT tracking algorithm may be created taking advantage of the disclosed approach. It is the applicant's intention that the scope of the patent issuing herefrom will be limited only by the scope of the appended claims.

The scan path described may be selected from a group including a circular scan path; a conical scan path; a Gabor scan path; an equal amplitude scan path; a spectrally compact scan path; and a spectrally compact equal amplitude scan path.

The morphologic estimator 408 may include an processor adapted to process a morphologic feature of the coherently detected received signal strength indicator signal to produce a tracking correction normalized to interference from an adjacent satellite, a data store adapted to communicate with the processor, an input for receiving the signal strength indicator signal from a position scan of the directional antenna, and an output for transmitting the tracking control signal to the directional antenna system.

Previous solutions for directional beam tracking systems are designed around steady state tracking requirements and generally utilize circularly symmetric radiation patterns. For example, a directional antenna, such as a dish type antenna, is pointed towards the source of the signal and a scan is then performed by a steering means that mechanically moves the dish antenna using a system of gears and motors. Typically, the gears and motors move the dish antenna mechanically in a symmetrical fashion about the expected center of the received signal beam. This is referred to as a conical scan.

Although the figures and examples disclosed herein specifically reference directionally agile antennas, the systems and methods disclosed are applicable to both directional antennas and directionally agile antennas. A directionally agile antenna, such as PAA 101, functions similarly to a directional antenna, but performs the pointing and scanning electronically instead of mechanically. The steering means that performs the pointing and scanning for a directionally agile antenna, rather than being mechanical, is typically an electronics package comprising one or more microprocessors or digital signal processing systems, and associated digital to analog converters and amplifiers. The offset error for a directionally agile antenna can be measured by introducing a circular scanning motion at a small angle around the expected center of the signal beam. If the receiving main lobe is symmetric, offset in true position of the signal beam from boresight, or direct alignment, will appear as a sinusoidally modulated tracking signal 404 at the scanning frequency. The scanning motion may be a conical scan in some instances.

What is claimed is:

1. A method of reducing an impairment to a tracking signal for a directional antenna system due to interference from an adjacent transponder, comprising:
   scanning a directional antenna in a scan path to produce a received signal strength indicator (RSSI) signal;
   detecting coherently said RSSI signal to produce an RSSI image;
   performing a morphologic estimate of said RSSI image based at least in part on a morphologic feature of said RSSI image to produce a normalized tracking correction; and
   outputting said normalized tracking correction to the directional antenna system.

2. The method of claim 1, further comprising:
   applying said normalized tracking correction to an open loop tracking system to produce a corrected tracking for the directional antenna system.

3. The method of claim 1, wherein said scan path is selected from the group consisting of a circular scan path; a conical scan path; a Gabor scan path; an equal amplitude scan path; a spectrally compact scan path; and a spectrally compact equal amplitude scan path.

4. The method of claim 1, wherein the directional antenna system further comprises:
   a very small aperture directional antenna.

5. The method of claim 1, further comprising:
   inertially stabilizing the directional antenna system using, at least in part, an inertial reference unit; and
   correcting for pointing inaccuracy of said inertial reference unit using said normalized tracking correction.

6. The method of claim 1, further comprising:
   performing a polarization scan of the RSSI signal;
   detecting coherently said RSSI signal to produce a polarization image;
   performing a morphologic estimate of said polarization image to produce a normalized polarization correction based at least in part on a morphologic feature; and
   outputting said normalized polarization correction to the directional antenna system.

7. The method of claim 6, wherein said polarization scan holds a polarization of the directional antenna constant during each operation of scanning a directional antenna in a scan path, and changes said polarization of the directional antenna prior to a subsequent operation of scanning in a scan path.

8. The method of claim 7, wherein said performing said polarization scan results in said polarization images being detected at a polarization image rate that is an integer submultiple of a position image rate that said RSSI images are detected.

9. The method of claim 6, wherein said normalized tracking correction is based on a morphologic estimate of said RSSI image and said polarization image.

10. The method of claim 1, wherein said morphologic feature is selected from the group consisting of a centroid feature; a compactness feature; a skewness feature; a kurtosis feature; a centroid squared feature; a (1-compactness) squared feature; a skewness squared feature; a kurtosis squared feature; a centroid*compactness feature; a centroid*skewness feature; a centroid*kurtosis feature; a compactness*skewness, compactness*kurtosis feature; and a skewness*kurtosis feature.

11. A system for orienting an antenna in a direction towards a source of electromagnetic radiation, comprising:
   a directional antenna operably adapted to scan in an estimated direction of the source of the electromagnetic radiation to produce a received signal strength indicator signal;
   a coherent detector operably adapted to create a received signal strength image from said received signal strength indicator signal;
   a morphologic estimator operably adapted to receive said received signal strength image, and measure a feature of said received signal strength image to create a tracking control signal that is normalized to the source of electromagnetic radiation and immune to interference from an adjacent source of electromagnetic radiation;
   a steering means adapted to orient said directional antenna based at least in part upon said tracking control signal.

12. The system of claim 11, wherein said morphologic estimator comprises:
   a processor adapted to process said coherently detected received signal strength indicator signal;
   a data store adapted to communicate with said processor; and
   an input for receiving said received signal strength image and an output for transmitting said tracking control signal to said directional antenna system.

13. The system of claim 12, wherein said directional antenna is operably adapted to perform a polarization scan and further comprising:
   a coherent polarization detector to produce a polarization received signal strength image from said received signal strength indicator signal; and
   wherein said morphologic estimator receives said polarization received signal strength image and measures a feature of said polarization received signal strength image to creates a polarization tracking control signal that is normalized to the source of electromagnetic radiation and immune to interference from said adjacent source of electromagnetic radiation, and
   wherein said output transmits said normalized polarization correction to said directional antenna system.

14. The system of claim 11, wherein said directional antenna is selected from the group consisting of a directionally agile antenna, a phased array antenna, and a very small aperture terminal.

15. The system of claim 11 wherein said source of electromagnetic radiation selected from the group consisting of a communications link from a mobile network element; a communications satellite; a Global Positioning System satellite; a radar; and a celestial object.

16. The system of claim 11, wherein said scan is selected from the group consisting of a circular scan; a conical scan; a Gabor scan; an equal amplitude scan; a spectrally compact scan; and a spectrally compact equal amplitude scan.

17. The system of claim 13, wherein said polarization of said directional antenna is held constant during a single closed scan for the tracking signal, and said polarization of the directional antenna is changed prior to a subsequent closed scan for the tracking signal, and results in a single polarization received signal strength image being produced over an integer multiple of closed scans of said scan path.

18. The system of claim 13, wherein said morphologic estimator creates said tracking control signal based on a feature of said received signal strength image and a feature of said polarization received signal strength image.

19. The system of claim 11, wherein said morphologic estimator measures a feature of said received signal strength image selected from the group consisting of a centroid feature; a compactness feature; a skewness feature; a kurtosis feature; a centroid squared feature; a (1-compactness) squared feature; a skewness squared feature; a kurtosis squared feature; a centroid*compactness feature; a centroid*skewness feature; a centroid*kurtosis feature; a compactness*skewness, compactness*kurtosis feature; and a skewness*kurtosis feature.

20. An apparatus for providing a tracking correction for a directional antenna, comprising:
   an input for receiving a received signal strength indication signal from a position scan of the directional antenna;
   a processor for processing a morphologic feature of said received signal strength indicator signal to produce a tracking correction normalized to interference from an adjacent satellite; and
   an output for transmitting the tracking correction to the directional antenna.

21. The apparatus of claim 20, wherein said position scan is selected from the group consisting of a circular scan; a conical scan; a Gabor scan; an equal amplitude scan; a spectrally compact scan; and an spectrally compact equal amplitude scan.

22. The apparatus of claim 21, wherein the directional antenna is operably adapted to perform a polarization scan, said polarization scan being interleaved with an integer multiple of said position scans;
   wherein said input receives said received signal strength indication signal resulting from said polarization scan of the directional antenna; and
   wherein said processor further processes a morphologic feature of said received signal strength indicator signal from said polarization scan to produce a polarization correction normalized to interference from said adjacent satellite.

23. The apparatus of claim 20, wherein said morphologic feature is a feature selected from the group consisting of a centroid feature; a compactness feature; a skewness feature; a kurtosis feature; a centroid squared feature; a (1-compactness) squared feature; a skewness squared feature; a kurtosis squared feature; a centroid*compactness feature; a centroid*skewness feature; a centroid*kurtosis feature; a compactness*skewness, compactness*kurtosis feature; and a skewness*kurtosis feature.

* * * * *